US011699247B2

(12) United States Patent
Ye et al.

(10) Patent No.: US 11,699,247 B2
(45) Date of Patent: Jul. 11, 2023

(54) SYSTEM AND METHOD FOR RUNTIME DETERMINATION OF CAMERA MISCALIBRATION

(75) Inventors: Xiangyun Ye, Framingham, MA (US); David Y. Li, West Roxbury, MA (US); Guruprasad Shivaram, Chestnut Hill, MA (US); David J. Michael, Wayland, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 12/647,192

(22) Filed: Dec. 24, 2009

(65) Prior Publication Data
US 2011/0157373 A1  Jun. 30, 2011

(51) Int. Cl.
*G06T 7/80* (2017.01)

(52) U.S. Cl.
CPC ...... *G06T 7/85* (2017.01); *G06T 2207/10012* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 5,257,203 A | 10/1993 | Riley et al. | |
| 6,026,172 A | 2/2000 | Lewis, Jr. et al. | |
| 6,075,881 A | 6/2000 | Foster et al. | |
| 6,078,701 A | 6/2000 | Hsu et al. | |

(Continued)

FOREIGN PATENT DOCUMENTS

| | | |
|---|---|---|
| CN | 1758018 A | 4/2006 |
| JP | 2003279315 | 10/2003 |

(Continued)

OTHER PUBLICATIONS

Hermans, et al., "Extrinsic Recalibration in Camera Networks", "Computerand Robot Vision", May 1, 2007, pp. 3-10, Publisher: IEEE, Published in: US.

(Continued)

*Primary Examiner* — Mikhail Itskovich
(74) *Attorney, Agent, or Firm* — Loginov & Associates. PLLC; William A. Loginov (57) ABSTRACT

This invention provides a system and method for runtime determination (self-diagnosis) of camera miscalibration (accuracy), typically related to camera extrinsics, based on historical statistics of runtime alignment scores for objects acquired in the scene, which are defined based on matching of observed and expected image data of trained object models. This arrangement avoids a need to cease runtime operation of the vision system and/or stop the production line that is served by the vision system to diagnose if the system's camera(s) remain calibrated. Under the assumption that objects or features inspected by the vision system over time are substantially the same, the vision system accumulates statistics of part alignment results and stores intermediate results to be used as indicator of current system accuracy. For multi-camera vision systems, cross validation is illustratively employed to identify individual problematic cameras. The system and method allows for faster, less-expensive and more-straightforward diagnosis of vision system failures related to deteriorating camera calibration.

18 Claims, 8 Drawing Sheets

(56) References Cited

U.S. PATENT DOCUMENTS

| | | | |
|---|---|---|---|
| 6,151,406 | A | 11/2000 | Chang et al. |
| 6,178,392 | B1 | 1/2001 | Mack et al. |
| 6,476,803 | B1 | 11/2002 | Zhang et al. |
| 6,553,138 | B2 | 4/2003 | Rozin |
| 6,724,922 | B1 | 4/2004 | Vilsmeier |
| 6,768,509 | B1 | 7/2004 | Bradski et al. |
| 7,027,642 | B2 | 4/2006 | Rubbert et al. |
| 7,068,825 | B2 | 6/2006 | Rubbert et al. |
| 7,085,622 | B2 | 8/2006 | Sadighi et al. |
| 7,212,228 | B2 * | 5/2007 | Utsumi et al. ............ 348/139 |
| 7,305,121 | B2 | 12/2007 | Kaufmann et al. |
| 7,356,425 | B2 | 4/2008 | Krahnstoever et al. |
| 7,373,270 | B2 | 5/2008 | Ohashi et al. |
| 7,414,732 | B2 | 8/2008 | Maidhof et al. |
| 2007/0081714 | A1 | 4/2007 | Wallack et al. |
| 2007/0127774 | A1 | 6/2007 | Zhang et al. |
| 2007/0196016 | A1 * | 8/2007 | Chen .................. G06T 7/0018 382/190 |
| 2009/0066968 | A1 | 3/2009 | Ikeda et al. |

FOREIGN PATENT DOCUMENTS

| | | |
|---|---|---|
| JP | 2004220312 A | 8/2004 |
| JP | 2004306249 | 11/2004 |
| JP | 2004354256 | 12/2004 |
| JP | 2005233639 A | 9/2005 |
| JP | 2006214735 A | 8/2006 |
| JP | 2007010419 A | 1/2007 |
| JP | 2009053136 A | 3/2009 |
| JP | 2009511881 | 3/2009 |
| JP | 2010528318 | 8/2010 |
| WO | 2008147355 | 12/2008 |
| WO | 2008147355 A1 | 12/2008 |

OTHER PUBLICATIONS

Shu, et al., "A Multi-Camera System for Precise Pose Estimation in Industrial Applications", "International Conference on Automation and Logistics", Aug. 5, 2009, pp. 206-211, Publisher: IEEE, Published in: US.

Zomet, et al., "Omni-Rig: Linear Self-Recalibration of a Rig With Varying Internal and External Parameters", "Proceedings of the Eight IEEE International Conference on Computer Vision", Jul. 7, 2001, pp. 135-141, Publisher: IEEE, Published in: IL.

Marrion, et al., "System and Method for Three-Dimensional Alignment of Objects Using Machine Vision", Dec. 29, 2008, Published in: US.

Ye, et al., "System and Method for Validating Camera Calibration in a Vision System", Dec. 30, 2008, Published in: US.

Faugeras, et al., "The Representation, Recognition and Locating of 3-D Objects", "The International Journal of Robotics Research", 1986, pp. 27-52, vol. 5, No. 3, Publisher: Masssachusetts Institute of Technology, Published in: Massachusetts.

Zhang, Zhengyou, "A Flexible New Technique for Camera Calibration", Dec. 2, 1998, pp. 2-21, Publisher: Microsoft Research, Published in: Redmond, Washington/USA.

Stein et al, "Monitoring Activities from Multiple Video Streams Establishing a Common Coordinate Frame", Apr. 1999, pp. 1-23, Publisher: Massachusetts Institute of Technology, Published in: Massachusetts.

Hartley, et al., "Multiple View Geometry, 2D Ed.", 2004, Publisher: Cambridge University Press.

P. Wunsch et al, "Real-Time Pose Estimation of 3-D Objects from Camera Images Using Neural Networks", Apr. 2007, pp. 3232-3237, Publisher: IEEE, Published in: Albuquerque.

Lavalee, et al, "Recovering the Position and Orientation of Free-Form Objects from Image Contours Using 3D Distance Maps", "Transactions on Pattern Analysis and Machine Intelligence", Apr. 17, 1995, pp. 378-382, vol. 17, No. 4, Publisher: IEEE, Published in: New York.

Tsai, "A Versatile Camera Calibration Technique for High-Accuracy 3D Machine Vision Metrology Using Off-The-Shelf TV Cameras AN", Aug. 1997, pp. 323-344, vol. RA-3, No. 4, Publisher: IEEE Journal of Robotics and Automation.

Wunsch et al, "Registration of CAD-Models to Images by Interactive Inverse Perspective Matching", "Proceedings of ICPR '96", 1996, pp. 78-83, Publisher: IEEE, Published in: Wessling.

Haralick et al., "Pose Estimation From Corresponding Point Data", "Transactions on Systems, Man and Cybernetics", Nov./Dec. 1989, pp. 1426-1446, vol. 19, No. 6, Publisher: IEEE, Published in: USA.

* cited by examiner

SYSTEM AND METHOD FOR RUNTIME DETERMINATION OF CAMERA MISCALIBRATION

FIELD OF THE INVENTION

This invention relates to vision systems and more particularly to calibration of vision system cameras.

BACKGROUND OF THE INVENTION

Machine vision systems are commonly employed in industry to determine the alignment of parts and objects with respect to a predetermined two-dimensional (2D) or three-dimensional (3D) coordinate space. These systems employ various techniques and programs to determine alignment of objects, often based on trained models of the objects. Camera calibration is an essential step in computer vision—both in two-dimensional (2D) and three-dimensional (3D) imaging systems. Camera calibration involves modeling a camera's position and lens characteristics known as the extrinsic and intrinsic parameters. Camera calibration can be performed on either a single camera or a multi-camera arrangement, such as a system that includes one or more stereo camera heads. Stereo camera heads, and other forms of 3D sensors, enable the generation of a 3D depth image of an object. The calibration of these cameras determines the relationship between the observed 2D image spaces and the 3D world. After camera calibration, the 3D information can be inferred from 2D computer image coordinates, and likewise, the 2D image coordinates can be inferred from 3D information.

More particularly, camera calibration involves modeling an image formation system by estimating internal geometric and optical camera characteristics (intrinsic parameters, which can include effective focal length, or image plane to projective center distance, lens distortion coefficient, scale factor for x, due to camera scanning and acquisition timing error, computer image coordinate for the origin in the image plane) and the 3D position and orientation of the camera relative to a defined world coordinate system (extrinsic parameters). The camera intrinsics and extrinsics (which are often referred to as camera calibration parameters) are used in runtime alignment or inspection tasks to remove the lens distortion and interpret the observed 2D image feature points in a 3D space. The accuracy of camera calibration directly affects the performance of a vision system.

The use of one or more 2D or 3D cameras at one or more respective vantage points around a scene containing an object can provide advantages in generating an overall image of the subject object with respect to a world coordinate space. By combining the images of different cameras, various occlusions and obstructions of parts of the object which may occur in one or more images are compensated for by images acquired from other vantage points. Thus, in all cases, but particularly where a vision system may employ a plurality of 2D or 3D cameras, the accuracy of camera calibration is crucial to the overall performance of the vision system. However, camera calibration is typically considered to be a one-time vision system setup procedure. It is usually performed by technicians with significantly more knowledge of the vision system than the typical runtime users—who are often manufacturing line workers and their supervisors. Typically, after the system is calibrated, the camera parameters are used repeatedly by machine vision tasks by these runtime users without regard to the true accuracy of the current calibration. As calibration is a demanding and time-consuming task, undertaken by skilled technicians, it is best performed only when actually required.

However, when the vision system operates in adverse environment, such as a manufacturing line, the actual camera position and lens distortions may change due to thermal expansion, vibration, inadvertent focus change, etc. Consequently, a machine vision application may perform suboptimally if the camera calibration no longer represents the relationship between observed 2D images and the 3D world. Furthermore, even if a machine vision application is performing suboptimally, it may be difficult to trace the root cause of the application's deteriorating performance due to camera miscalibration.

Validation of camera calibration on a periodic basis can help to ensure that cameras are functioning with acceptable calibration parameters and avoid performing unnecessary calibration procedures, or conversely, continuing to operate cameras that are out-of-calibration. A novel and efficient approach to periodically validating camera calibration, applicable a single, or plurality, of 2D or 3D cameras is taught in U.S. patent application Ser. No. 12/346,773, entitled SYSTEM AND METHOD FOR VALIDATING CAMERA CALIBRATION IN A VISION SYSTEM, by Xiangyun Ye, et al., the teachings of which are incorporated herein by reference by way of useful background information. Briefly, this validation procedure entails taking the camera system out of runtime operation and placing a calibration target into the field of view of the cameras. A validation procedure is then performed using this target, typically by the runtime operators of the system, rather than calibration technicians. This procedure yields the current intrinsic and (in the case of multiple-camera systems) extrinsic parameters. Intrinsic parameters include effective focal length, or image plane to projective center distance, lens distortion coefficient, scale factor for x, shift in origin of the acquired images due to camera scanning and acquisition timing error. Extrinsic parameters are typically defined by the 3D position and orientation of the camera relative to a defined world coordinate system. These current parameters are analyzed with respect to stored, setup-time intrinsics and extrinsics to determine if the camera system and/or individual cameras therein remain within acceptable calibration. This validation procedure shortens the system downtime significantly because the validation procedure takes only a fraction of calibration time, and a recalibration need to be performed only if the validation procedure indicates the cameras are "out of calibration". Likewise, it can be performed by the runtime operators of the system. Nevertheless, this approach still requires that the system is not running production when the validation procedure is performed. The frequency of performing validation can be problematic, as validating too often requires more downtime of the vision system, which reduces the production line throughput. Conversely, validating too infrequently can put the 3D vision system at risk of excessive false reject/accept with deteriorating camera calibration.

It is therefore desirable to provide a system and method for diagnosis of calibration of a camera system during runtime that does not require the system to be taken offline, or for a separate validation process to be undertaken by system operators. Such a system and method should enable a frequent validation that better ensures no false readings will occur due to an out-of-calibration camera system.

SUMMARY OF THE INVENTION

This invention provides a system and method for runtime determination (self-diagnosis) of camera miscalibration (accuracy), typically related to camera extrinsics, based on historical statistics of runtime measurements of objects acquired in the scene. One example of the runtime measurement is alignment score, which is defined based on matching of observed and expected image data of trained object models. This arrangement avoids a need to cease runtime operation of the vision system and/or stop the production line that is served by the vision system to diagnose if the system's camera(s) remain calibrated. Under the assumption that objects or features inspected by the vision system over time are substantially the same, the vision system accumulates statistics of part alignment results and stores intermediate results to be used as indicator of current system accuracy. For multi-camera vision systems, cross validation is illustratively employed to identify individual problematic cameras. The system and method allows for faster, less-expensive and more-straightforward diagnosis of vision system failures related to deteriorating camera calibration.

In an illustrative embodiment, a system comprising a multiplicity of cameras, illustratively consisting of three or more cameras, is directed at a scene from discrete vantage points. The at least three cameras are initially calibrated, which includes finding respective extrinsic calibration parameters for each of the at least three cameras. A first object feature or the overall object (or a portion thereof) is found in three-dimensional space with a first plurality of the at least three cameras. A first measurement of the first object feature or a first object pose is then derived. A second object feature or the overall object (or a portion thereof) is found in three-dimensional space with a second plurality of the at least three cameras. A second measurement of the second object feature or second object pose is then derived. The found first feature can be substantially similar to the second found feature, or the two features can differ and be separated by known physical dimensions. The first measurement and the second measurement are then compared with respect to at least one of (i) an accuracy determined during the calibration procedure, (ii) a desired system accuracy, and (iii) a known property of the two features. Illustratively, the first measurement comprises an estimated first location of the first feature and the second measurement comprises an estimated second location of the second feature. The first measurement can comprise a score of success in finding the first feature and the second measurement can comprise a score of success in finding the second feature. In an embodiment, the comparing step or process includes computing a discrepancy between the first measurement and the second measurement and comparing the discrepancy with respect to at least one of (i) the accuracy determined during calibration, (ii) the desired system accuracy, and (iii) a known property of the object.

In illustrative embodiments, in response to the comparing step or process, a signal is issued, indicating required recalibration based upon a result of the step of comparing exceeding of at least one of the (i) accuracy determined during step (a) and (ii) the desired system accuracy. This can include generating new extrinsic calibration parameters based upon the comparing, and providing the extrinsic calibration parameters to at least one of the at least three cameras so as to recalibrate the at least one of the at least three cameras. Illustratively, the system of at least three cameras can include a machine vision system inspection function so as to perform runtime machine vision inspection to objects that pass through a volume space viewed by the at least three cameras. These objects form the basis for the generation of measurements by the pluralities of cameras.

BRIEF DESCRIPTION OF THE DRAWINGS

The invention description below refers to the accompanying drawings, of which.

DETAILED DESCRIPTION

A. System Overview and Calibration

Figure 1:
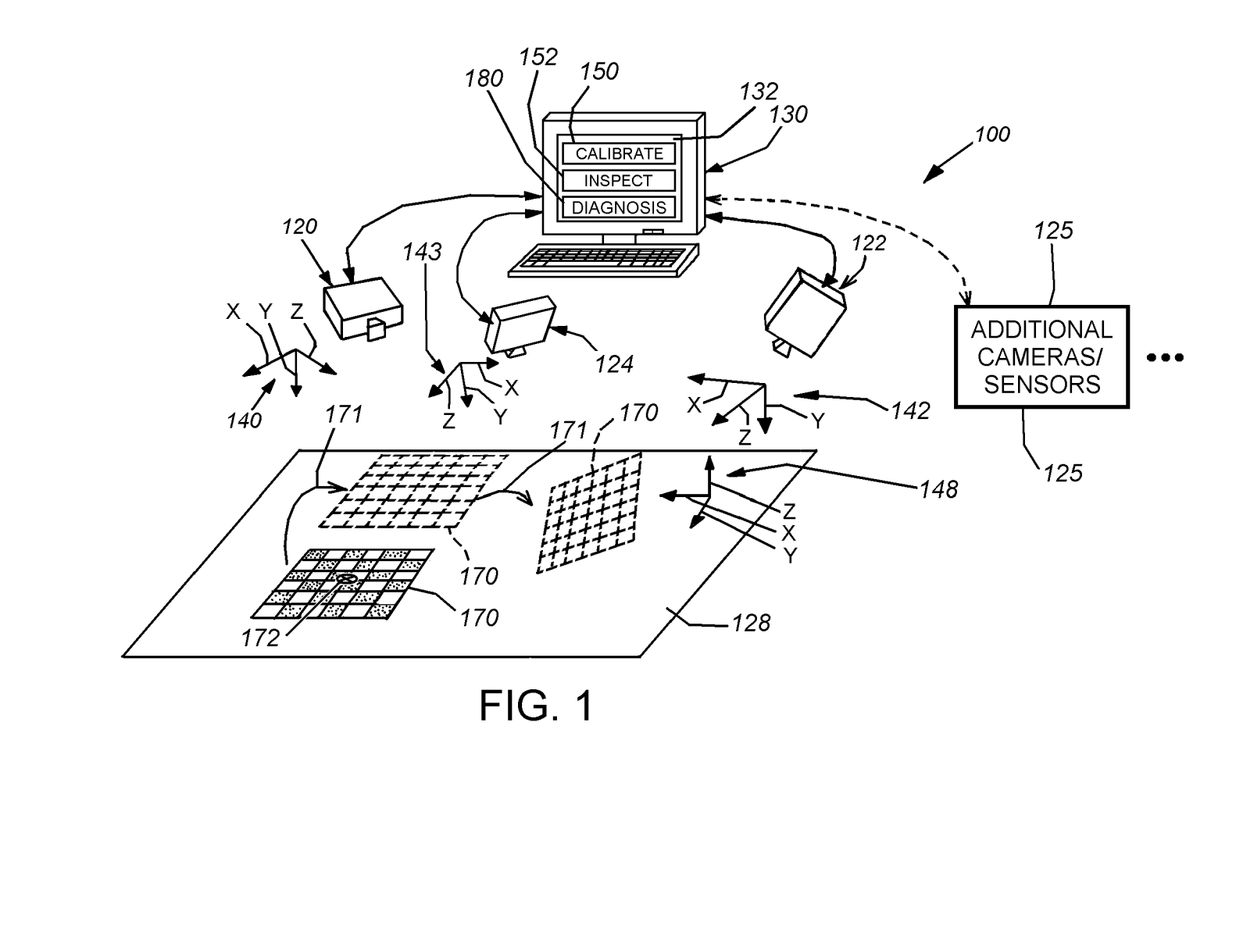
FIG. 1 is a diagram of a vision system employing at least three discrete cameras to acquire images of objects within a scene in three-dimensional space in accordance with an illustrative embodiment, including an exemplary calibration object, used to establish an initial calibration of the camera system.

FIG. 1 depicts a typical arrangement for a vision system 100 for determining the two-dimensional (2D) or three-dimensional (3D) alignment, or pose, of a viewed scene that can include one or more runtime objects to be inspected, aligned, acted upon by a robot manipulator, or any other operation that is controlled or assisted by machine vision processes. The system can be calibrated (and calibration can be later self-diagnosed) according to an illustrative embodiment of this invention.

In general, the system 100 can be any vision system arrangement containing at least three cameras having the object-containing scene 128 within its field of view. The camera(s) or sensor(s) 120, 122, 124 can each comprise a 2D camera as shown, or optionally, a 3D sensor. Where provided, a 3D sensor can be adapted to generate depth images of a scene using optical triangulation between two discrete cameras (binocular vision) within a stereo camera head, separated by a known baseline therebetween. More generally, a 3D sensor can be based upon various sensing modalities that can generate depth data using a variety of techniques a variety of techniques including, but not limited to stereo (multiple camera) imaging, Light Detection and Ranging or LIDAR, structured light, or devices that employ a scanning laser. Likewise, 2D and 3D imaging devices can operate according to a variety of principles including CCD and CMOS. For either 2D cameras or 3D sensors, a plurality of additional cameras/sensors, shown generically as block 125 can be located at different, discrete vantage points with respect to the scene 128. Where a plurality of stereo camera heads are provided, individual cameras within each head can be accessed separately by the system or the depth image generated by the head is provided as a raw data feed to a processor. This processor, to which the 2D camera(s) and/or 3D sensors is connected is shown, by way of example, as a general purpose computer 130 with interface and display that implements a software and/or hardware-based calibration process (150), and can also implement runtime vision processes (inspection, alignment, manipulation, etc.) (152). The arrangement, type and location of the vision processor(s) are highly variable. In illustrative embodiments, the processor(s) can be contained within the one or more 2D cameras and/or 3D sensors and appropriate wired or wireless interconnections between multiple cameras and/or sensors can be provided.

In embodiments in which multiple 2D cameras and/or multiple 3D sensors are employed, each camera 120, 122, 124 defines its own internal coordinate system, herein depicted as orthogonal x, y and z axes 140, 142, 143 in which z is the camera optical axis directed toward the scene and x and y define the image plane. The vision processor (130) is adapted to calibrate each of these individual cameras' coordinate system to a common 3D world coordinate system 148, represented by the x, y and z axes with respect to the scene 128. A general discussion of 3D imaging and related concepts is found, by way of further background, in commonly assigned, U.S. patent application Ser. No. 12/345,130, entitled SYSTEM AND METHOD FOR THREE-DIMENSIONAL ALIGNMENT OF OBJECTS USING MACHINE VISION, by Cyril C. Marrion, et al., the teachings of which are incorporated herein by reference as useful background information.

Figure 1A:
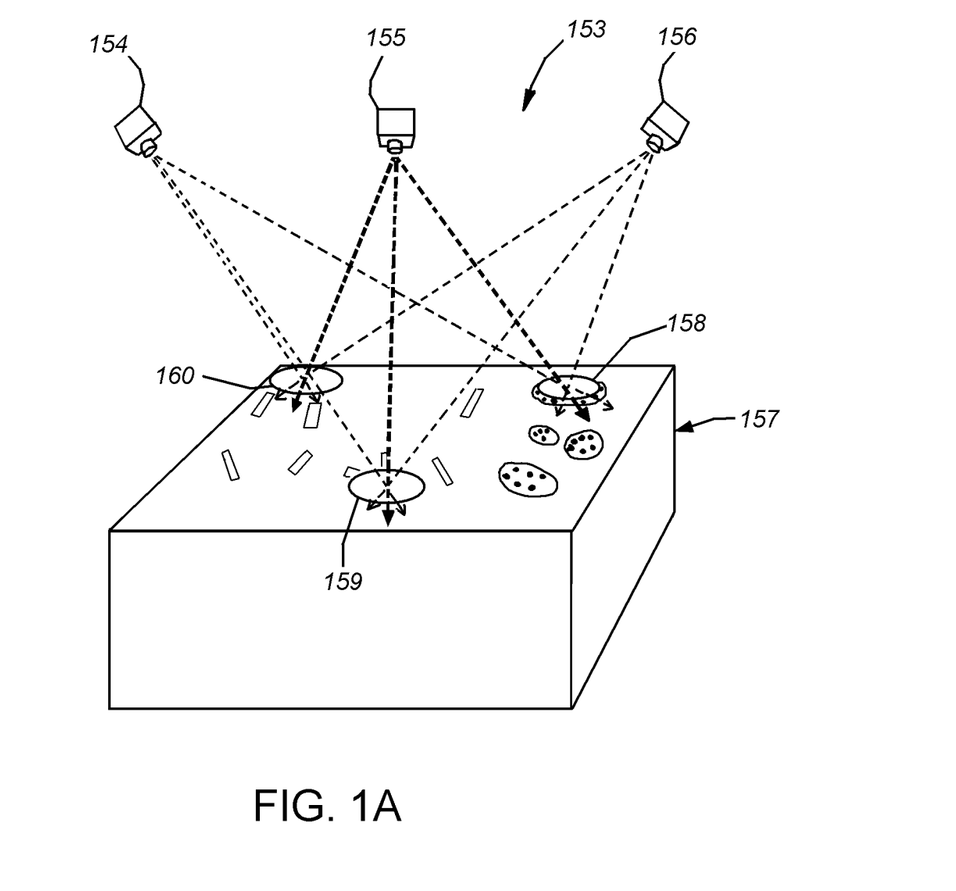
FIG. 1A is a diagram of an exemplary system of three cameras employed to undertake machine vision tasks with respect to an object.
Figure 1B:
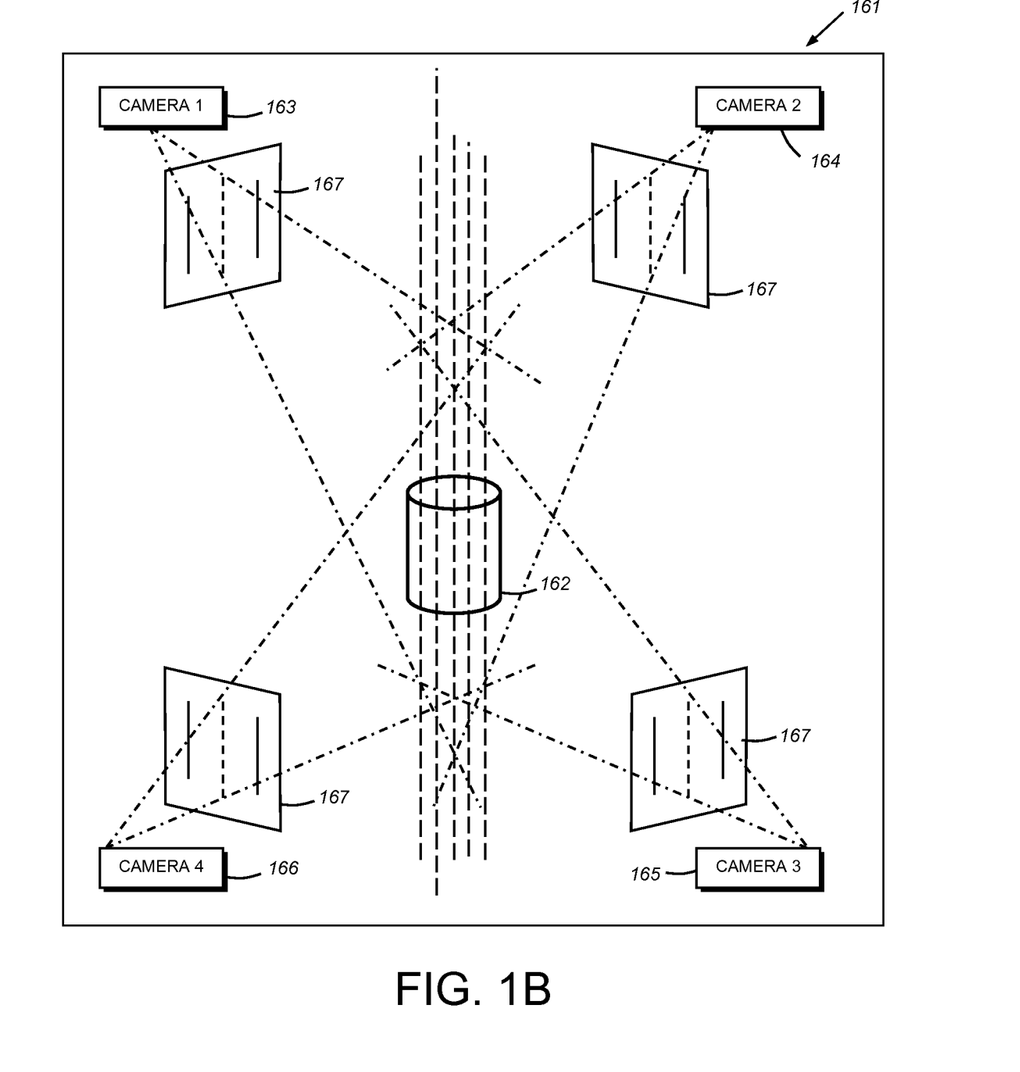
FIG. 1B is a diagram of an exemplary system of four cameras employed to undertake machine vision tasks with respect to an object.

FIGS. 1A and 1B detail two exemplary camera system arrangements that can be calibrated and subsequently (as depicted) employed in runtime vision inspection operations on objects in accordance with this invention. In each depicted arrangement, the alignment of an object in 3D space is achieved by triangulating the acquired images' features and evaluating the matching of the expected features and the measured image features.

In accordance with the exemplary three-camera system arrangement 153 of FIG. 1A, three cameras 154, 155, 156 are located at different orientations with respect to the object or part 157, which passes through the field of view of the system based upon a moving conveyor or other mechanism that allows a succession of objects to be inspected and/or aligned. This system 163 can be used to inspect parts for quality or allow orientation of a robot manipulator (not shown), among other tasks. The camera arrangement 153 in this example generally resembles that employed in vision guided robotics (VGR) applications. In such VGR applications, typically the part 157 is visible to all cameras 154, 155, 156. As described further below, the score of a part pose is based on triangulation error that measures how the observed images match trained model. In this case, the model includes one or more features 158, 159, 160 that are visible to each camera, as illustrated by the dashed lines. The cross reference discrepancy measures how closely the rays of same feature points from multiple cameras intersect with each other.

An alternate exemplary arrangement 161 of a camera system containing four cameras 163, 164, 165, 166 is shown in FIG. 1B. The cameras 163, 164, 165, 166 are each located at a discrete position with respect to the part 162, as shown and each define a corresponding image plane 167 oriented at a discrete x, y, z (or other coordinate system) orientation. In this arrangement, alignment of a part 162 need not be not based on cameras viewing common features simultaneously, but, illustratively, the score of a part pose is based on how the observed images match the predicted images from a trained 3D shape model. A variety of alternate multi-camera arrangements and runtime inspection/alignment procedures are expressly contemplated.

With further reference to FIG. 1, an exemplary camera calibration procedure, such as (but not limited to) calibration software available in connection with vision systems commercially available from Cognex Corporation of Natick, Mass. employs a flexible technique that typically requires the camera to observe a planar calibration object 170, having known size and shape, presented to the camera(s) 120, 122 and 124 at a plurality of different orientations (shown by way of example in phantom). This calibration procedure serves to adjust for each camera's intrinsics, and extrinsics (typically in a multiple camera embodiment), for defining the 3D world coordinate space for each camera. During the depicted calibration process, the technician or a robot moves (arrows 171) the calibration object 170—herein an illustrative checkerboard of known size and shape, which can also include a central fiducial 172—between each of the plurality of positions, while the calibration application 150 operates on the vision processing system 130 to acquire and analyze images of the object 170 at each position. Using the acquired images of the object, the camera calibration process estimates intrinsics and extrinsics from (image versus physical) feature correspondences relating observed 2D image feature points and 3D features that are located on a planar surface. In one example, these (image vs. physical) feature correspondences can be automatically determined by running, for example, the checkerboard feature extractor vision system software tool on images of a checkerboard calibration plate, both the software tool and the calibration plate are available from Cognex Corporation.

A well-known technique for camera calibration that can be applied to illustrative systems is described by Roger Tsai in A Versatile Camera Calibration Technique for High-Accuracy 3D Machine Vision Metrology Using Off-the-shelf TV Cameras and Lenses, IEEE JOURNAL OF ROBOTICS AND AUTOMATION, Vol. RA-3, No. 4, August 1987, pp. 323-344, the teachings of which are incorporated herein by reference as useful background information. Calibration procedures are more generally described in the above-incorporated U.S. patent application Ser. No. 12/346,773, entitled SYSTEM AND METHOD FOR VALIDATING CAMERA CALIBRATION IN A VISION SYSTEM. In addition, such procedures are referred to generally below in the context of the estimation of pose based upon acquired features in two discrete cameras.

In summary, camera calibration involves a non-linear optimization method to minimize the discrepancy between detected 2D image feature points (corner of checkers) and the predicted feature points. This camera calibration method computes the calibration plate poses (with respect to the camera).

Figure 2:
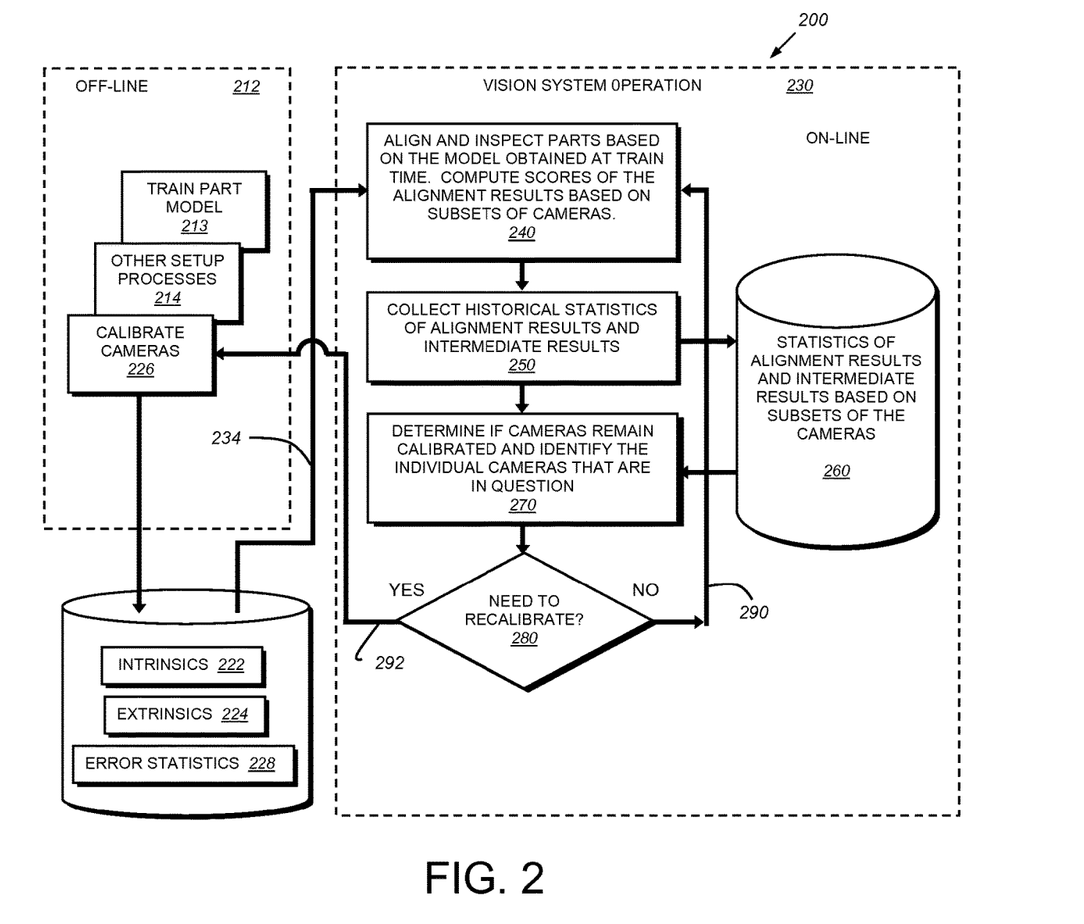
FIG. 2 is a block diagram of the setup and calibration process for a vision system having at lest three cameras and the runtime inspection and self-diagnosis process according to an illustrative embodiment.

Reference is now made to FIG. 2, which shows a schematic overview 200 of the system calibration process, runtime alignment or inspection tasks and self-diagnosis of the system calibration. As shown, as part of the offline processes 212 are the part or object training process 213 in which the vision system is trained to recognize one or more distinct object features (for example an edge, printing, hole, etc.) of a predetermined size, location and/or shape. Alternatively, the system can be trained to recognize the overall shape of the object, or a portion thereof. The training is dependent upon the particular applications being employed by the vision system. These can include blob analysis, edge detection, rotation and scale-invariant search, etc. Other setup processes 214 that are vision-system specific also occur during the offline process 212. These can include illumination control, coordination with a robot manipulator and a variety of other operations. Notably, the camera intrinsics 222 and extrinsics 224 are derived during calibration 226. These intrinsics and extrinsics are used (arrow 225) during system runtime operation (block 230). More particularly, extrinsics are used in the illustrative calibration self-diagnosis performed during runtime 230. In the illustrative embodiment, the setup storage 220 also stores "error" statistics 228 containing information with respect to the discrepancies between the observed image features and predicted physical features that can be used to define accepted thresholds that allow the system to determine whether calibration is still within tolerances.

Figure 3:
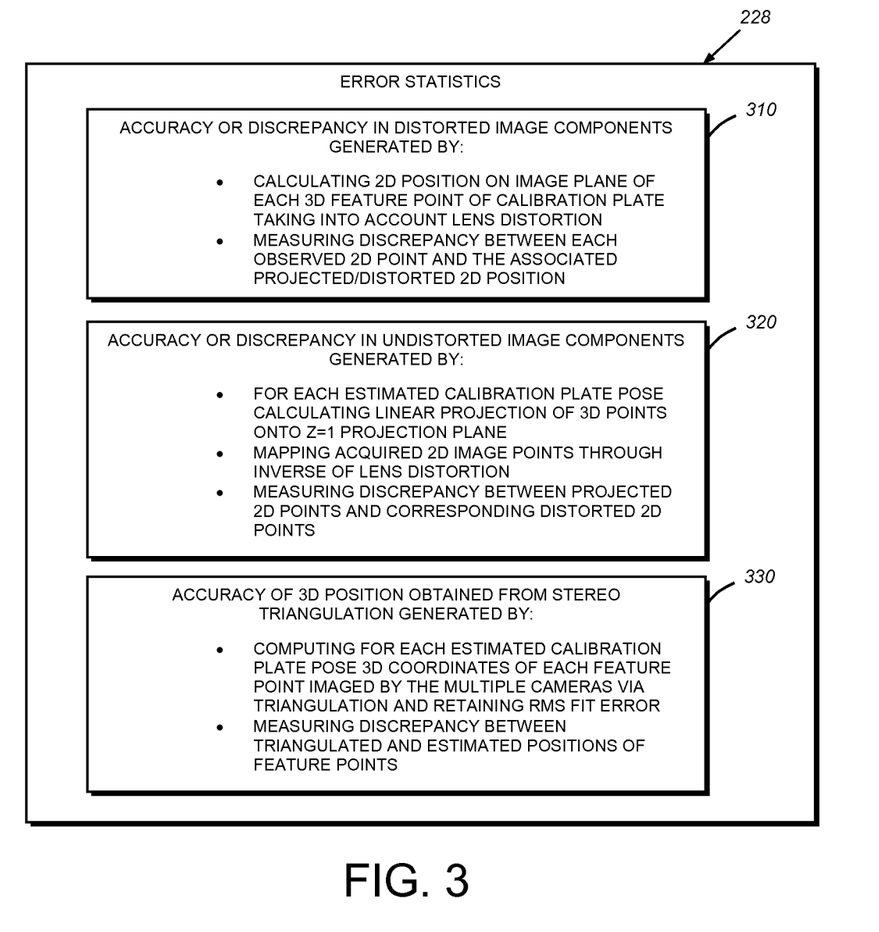
FIG. 3 is a diagram showing the various error statistics, subsets of which are used during the self-diagnosis process of FIG. 2

With reference also to FIG. 3, the stored error statistics 228 include, but are not limited to:
a. Accuracy or discrepancy in the distorted image coordinates (actual acquired pixels) 310. For each estimated calibration object/plate pose, the calibration process calculates the 2D position on the image plane of each 3D feature point (corners of checkers in the plate's pattern), taking into account lens distortion. The accuracy measurements correspond to the discrepancy between each observed 2D point and the associated projected/distorted 2D position, and are stored as error statistics 228;
b. Accuracy or discrepancy in the undistorted image coordinates (i.e. the z=1 projection plane in a 3D coordinate system in which z is the depth of each pixel and x, y are the 2D coordinates for each pixel within the field of view) 320. For each estimated calibration plate pose, the process calculates the linear projection of the 3D points onto the z=1 projection plane. In addition, the process maps the acquired 2D image points through the inverse of the lens distortion (in other words, points are recomputed using the stored lens correction factors). The accuracy measurements correspond to the discrepancy between the projected 2D points and the corresponding distorted 2D points and are stored as error statistics 228; and
c. Accuracy of 3D position obtained from stereo triangulation 330. For a multiple camera system, for each estimated calibration plate pose, the process computes the 3D coordinates of each feature point imaged by multiple cameras via triangulation and retains the rms-FitError. The discrepancies between triangulated and estimated positions of feature points for the multiple cameras are stored as error statistics 228.

The above-described accuracy measurements a-c above are well-known to those of ordinary skill in vision systems and can be generated using procedures known to those of ordinary skill. These measurements are typically used to compare one camera calibration method with another. In accordance with an illustrative embodiment, these error statistics 228 are stored so that they can be used to subsequently diagnose the accuracy of the camera calibration during runtime vision system operation (block 230 in FIG. 2). Note that the acceptance threshold can be variably set according to the particular vision system application requirements. That is, certain applications may dictate a higher degree of accuracy, requiring a lower acceptance threshold (e.g. a smaller difference between calibration and runtime/validation discrepancies).

The accuracy of camera calibration, described above, directly affects the performance of a vision system. While most vision systems consider camera calibration to be a one-time system set up task, the actual behavior of an image formation system may drift over time due to thermal expansion of camera frame, inadvertent movement of camera, etc. One way to address this drift is to periodically recalibrate the cameras. However, calibrating cameras is a demanding task that requires acquiring multiple images of a calibration target with various poses, and can be time consuming. Furthermore, it usually involves a skilled person, such as a system integrator. Consequently, camera calibration (block 226) is typically performed only when needed, and by skilled specialists.

B. Runtime Procedures

According to an illustrative embodiment, a calibration self-diagnosis process is part of the overall runtime vision system operation 230. Generally, the system in this example uses multiple cameras to align and inspect objects/parts based upon a training model, along with the stored intrinsics 222, extrinsics 224 and error statistics 228 (via process branch 234). Alignment results are collected from measurements, consisting of estimated locations (in x, y, z world coordinates, or another world coordinate system) of one or more object features, or the object pose. This data can be used to compute alignment scores in accordance with runtime block 240. As shown, the runtime process can collect historical statistics of alignment results as well as intermediate results (block 250). These are provided to a store 260, which collects and organizes the statistics of alignment results and intermediate results based on subsets or groupings (a plurality) or the overall system of three or more cameras. Thus, the groupings can be defined as a plurality consisting of at least two cameras, but less that the entire camera group of the at least three cameras. That is, the system generates a set of N Choose M groupings or subsets of camera combinations. Each feature location or pose being estimated by the vision system is illustratively evaluated with a scoring function defined to measure the matching of the trained 3D model and the observed image data. Pose candidates and associated scores can be estimated by selecting each of the N-choose-M camera combinations. More particularly, the store 260 can contain the statistics about the discrepancies between the observed image features and predicted physical features.

By way of example, the 3-camera (VGR) setup of FIG. 1A defines 3-choose-2, i.e., 3 camera combinations, can be used for part alignment (pose estimation). The 4-camera arrangement shown in FIG. 1B defines 4-choose-2 plus 4-choose-3, i.e., 10 camera combinations, can be used for part alignment (pose estimation). Among the 10 camera combinations, 4 camera combinations that use adjacent 2 cameras for part alignment may be most representative due to their favorable viewing angles.

In runtime process step 270, the stored statistics (block 260) are used to determine if the cameras remain within a predetermined calibration accuracy or threshold. The threshold can be cased on a predetermined value that may or may not depend upon the specific vision task. For example for a very precise task, the threshold can be a small value, while a trough manipulation task may allow for a larger value. The process step 270 determines which individual camera(s) have drifted sufficiently in accuracy. In general, such drifts involve extrinsic parameters—the relative state of one camera with respect to others in the system, rather than the intrinsic. However, the storing of intrinsic parameters is expressly contemplated, and these parameters can be made available in any subsequent recalibration step (226). The decision step 280 determines whether one or more cameras have drifted sufficiently in calibration to warrant performance of a recalibration procedure. If the threshold has not been reached, then the system continues to monitor and store statistics (via procedure branch 290) during the normal operation of runtime part or object inspection and/or alignment, in accordance with steps 240, 250, 260 and 270. However, if a predetermined accuracy/threshold in one or more cameras of the system is exceeded, then the decision step 280 branches (via branch 292) to the calibration step 226. As described below, the system may remain online and issue an indication or alert to the operator, or may cease operation and await action by the operators (e.g. a recalibration procedure). As part of step 280, the system can deliver the extrinsic parameters and discrepancy data derived during the runtime process (230), so that it can be used to identify the camera(s) requiring recalibration. Additionally, it is contemplated that automated recalibration procedures can be employed to (in accordance with conventional techniques) automatically recalibrate the camera(s) using the updated extrinsic parameters.

The comparison of calibration measurements versus runtime statistics in accordance with step 270 can be accomplished using a variety of techniques. One embodiment is to compare the accuracy observation in runtime statistics process and those measurements obtained calibration process using Statistical Hypothesis Testing. That is, given a distribution of calibration measurements and a distribution of runtime measurements, the statistical correlation of the two distributions. The Null Hypothesis can be set as the two procedures have the same accuracy with certain statistical significance. Once a decision is made based on the two sets of observations, the end user can determine if the cameras need to be recalibrated. Another embodiment provides a process that compares the maximum discrepancy to a threshold set as a function of discrepancies observed at camera calibration time.

Figure 4:
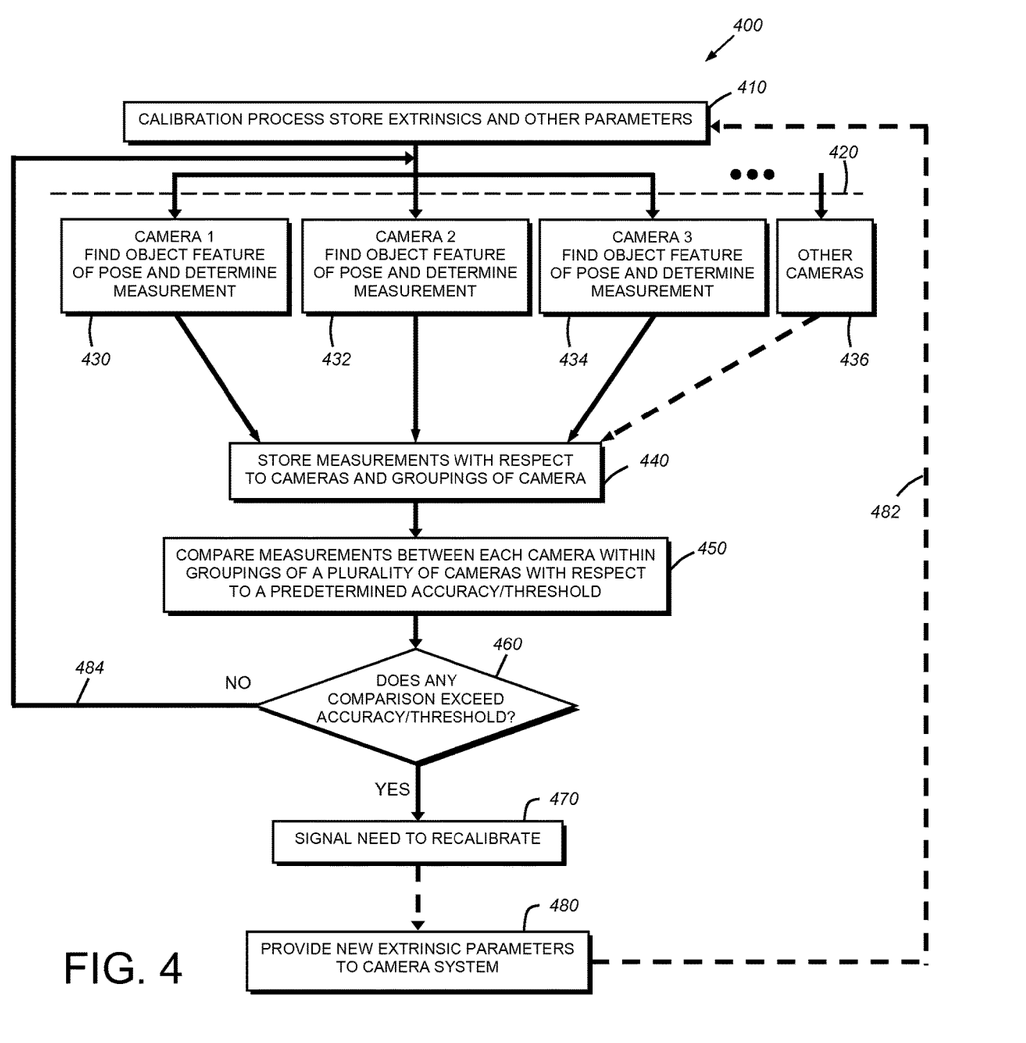
FIG. 4 is a flow diagram of an illustrative procedure for performing runtime self-diagnosis followed by recalibration, in accordance with the system and method herein.

Reference is now made to FIG. 4, which describes a generalized process 400 for runtime self-diagnosis of camera calibration in an arrangement of three or more cameras according to an illustrative embodiment. By way of example, this process can be instantiated in a diagnostic application 180 (FIG. 1) running on a computer or the processor, or it can be provided directly to the hardware of one or more cameras within the system. The calibration process is initially performed offline in accordance with step 410 and as described above. During this process, extrinsic parameters and other parameters and statistics, such as discrepancies between measurements of feature locations or pose with respect various camera groupings or subsets (e.g. camera pairs) are generated and stored. As noted, a "camera" as defined herein is any device that acquires a discrete image of a scene. A sensor is a form of camera that can include one or more imaging devices (cameras, as well as other range-finding devices for 3D imaging.

The process 400 then subsequently enters a runtime stage (dashed line 420) in which the object feature, or the overall object is found by each camera in the system—at least three cameras as depicted by blocks 430, 432, 434, and other cameras where applicable (block 436). The found feature can be substantially the same (i.e. each camera generally finding the same feature with its own estimate of location in world x, y, z or other coordinates. Alternatively, different cameras can find one or more different features, which are at known positions with respect to each other in physical space. This may be appropriate where some cameras have a degraded or obscured view of a feature that other cameras have found. Alternatively, each camera can determine a pose in three-dimensional space of the object based upon the trained model. In accordance with blocks 430, 432, 434, 436, the cameras each determine a "measurement" of the feature of object. Illustratively, the measurement can be an estimated x, y, z (or other coordinate system) location for a feature, a pose, or a score of how successfully the feature or object is found by each camera. The measurements from each camera can be stored in step 440 with respect to each camera in the system. They can be organized into camera groupings and translated into an appropriate format.

Feature locations and/or pose in three-dimensional space can be determined by a wide range of conventional machine vision techniques, including edge-finding, blob analysis, rotation and scale-invariant search, etc. A technique for finding pose in 3D is also described in the above-incorporated U.S. patent application Ser. No. 12/345,130, entitled SYSTEM AND METHOD FOR THREE-DIMENSIONAL ALIGNMENT OF OBJECTS USING MACHINE VISION.

In step 450, the measurements of the features found by each of a plurality of cameras (groupings or subsets of cameras from the overall multi-camera system, typically in camera pairs) are then compared to derive a score or residual error of the triangulation result therebetween. This can be also defined as the discrepancy. These comparisons are in turn analyzed with respect to a threshold or accuracy value. The accuracy value can be defines as a desired, preset value, provided by the user or preprogrammed in the system. Such a discrete threshold can be in part based on the needed accuracy, which dictates the level of tolerance for camera drift—i.e. low accuracy allows for more camera drift before recalibration is needed, while higher accuracy dictates less camera drift. Alternatively, the accuracy can be a system accuracy that is defined based upon an accumulation of residual errors or discrepancies derived during calibration.

In decision step 460, the comparison of measurements from each camera grouping or subset in step 450 that results in exceeding of the threshold or accuracy causes the system to issue a signal to recalibrate, or take other appropriate action (step 470). The action taken can depend upon a number of factors and programmed instructions. For example, if the threshold is not significantly exceeded, the system may issue a warning to recalibrate but continue to operate. Alternatively the signal can cause the system to shut down and sound an alarm. In a further embodiment, the system can optionally use the stored measurements, which over a number of object inspection cycles as a reasonably accurate indicator of present system state, to derive new extrinsic parameters (step 480) for the one or more out-of-calibration cameras. These new extrinsic parameters can be returned to the appropriate camera(s) (via procedure branch 482), and used to perform a recalibration, either by personnel, or in an automated matter (e.g. replacing the camera's existing extrinsic parameters with new extrinsic parameters that account for the detected drift). The recalibration can be accomplished offline, or, where appropriate applications are provided, in an on-the-fly manner with the recalibrating camera, or at least other non-recalibrating cameras in the system, remaining online to continue inspection tasks. In any recalibration, it is contemplated that intrinsics can also be updated using appropriate calibration objects and/or other procedures.

Where decision step 460 determines that the measurements compared for each of the camera groupings remains within allowed accuracy, the runtime procedure continues (via procedure branch 484), and accumulates further measurements. Note that any comparison with respect to system or desired accuracy can take into account the average (historical) measurements over many inspection cycles so that a relatively small number of anomalous measurements do not cause a premature recalibration signal.

Note that the acceptable error for a camera due to drift can be based on error distribution. For example, the system can be adapted to review RMS error of position with respect to the error history.

In general, given three or more cameras, the system includes inherent redundancy in the measurement of objects. This redundancy allows for disagreements in measurements between subset groupings of the overall group of cameras to indicate an out-of-calibration condition in at least one of the cameras.

C. An Illustrative Technique for Determining and Comparing Location and Pose Estimates In accordance with the comparison step 450 of FIG. 4, the system can employ a variety of techniques to determine 3D feature location or pose of an object and derive errors or discrepancies based upon the estimation. The following is an illustrative technique for determining and comparing.

Figure 6:
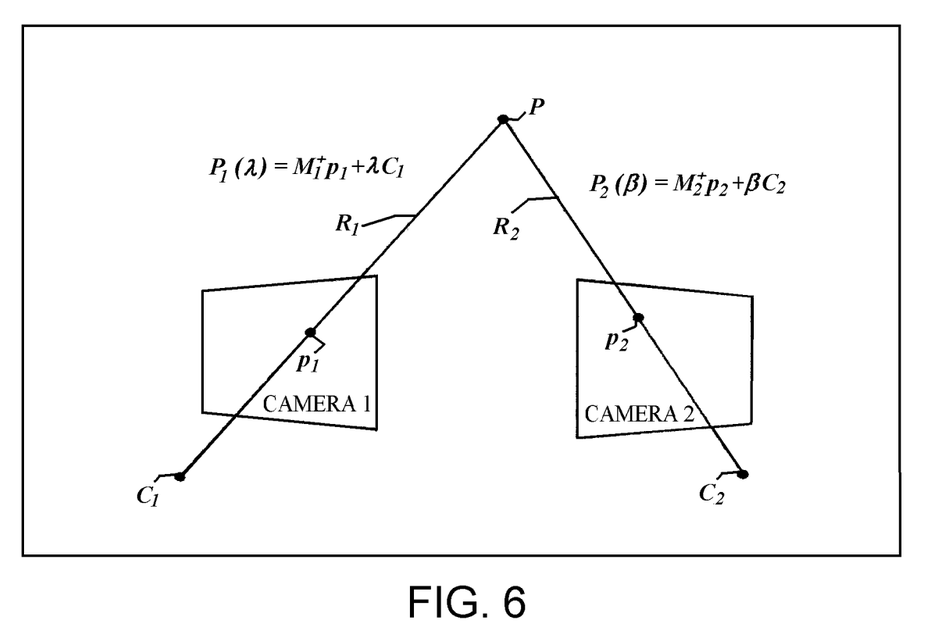
FIG. 6 is a graphical representation of triangulation of a point in a world coordinate system from its image points in two or more (a plurality of) cameras for use in embodiments herein.

1. Estimating 3D Position of a Feature Point from 2D Image Points in Multiple Cameras Following the camera calibration, a 3D point in physical space can be mapped to a 2D point in image space; a 2D point in image space can be mapped to a 3D ray in physical space. The following description of mapping is further discussed, by way of background in the book *Multiple View Geometry*, Second Ed., by Richard I. Hartley and Andrew Zisserman, Cambridge University Press, 2004. To simplify the present description, it is now assumed that the radial distortion is negligible. Thus, the mapping from a point in the 3D world coordinate system 510 to processor image coordinate system 520 is governed by the camera calibration matrix M. For a system with n cameras these matrices can be denoted as $M_i$, $1 \leq i \leq n$. Referring to FIG. 6, a point P in the world is mapped as $p_i$ according to the equation $p_i = M_i P$. Similarly given the image of a point (exemplary points $p_1$ and $p_2$ as shown) in two or more cameras (exemplary CAMERA1 and CAMERA2 as shown), its position in the world coordinate system can be computed using triangulation. For a point $p_i$ ($p_1$, $p_2$) in respective camera i (CAMERA1, CAMERA2) the image projects as a ray $R_i$ ($R_1$ and $R_2$). The equation of the ray in the world coordinate system is given by $P_i(\lambda) = M_i^+ p_i + \lambda C_i$, where $C_i$ ($C_1$ and $C_2$) is the center of the camera in the world coordinate system. $C_i$ and $M_i^+$ are obtained from the camera calibration parameters. The point in the world coordinate system can be obtained by finding the point of intersection between the rays from the multiple cameras.

In practice, when noise is present, the two rays ($R_1$ and $R_2$) are not guaranteed to intersect. There are several techniques available to triangulate in such situations. The illustrative embodiment employs a technique that first finds a point in world coordinate system that has the least sum of distance between the point and all the rays. This estimate is refined based upon the distance of the point from the centers of the camera and the angle of the rays to the optical axis. Other techniques for triangulation can also be employed in addition to, or in substitution for, this technique.

Thus, referring further to FIG. 6, the value for point P is derived using triangulation as described herein, and the location P is computed by finding the values of $\lambda$ and $\beta$ in the equations $P_1(\lambda) = M_1^+ p_1 + \lambda C_1$ and $P_2(\beta) = M_2^+ p_2 + \beta C_2$.

2. Estimating 3D Pose of an Object From 2D-3D Correspondences

A pose of an object is the 3D rigid transformation needed to map an object model from its inherent coordinate system into agreement with the sensory data. Estimating the pose of a rigid body means to determine the rigid body motion in the 3D space from 2D images. Knowing the 3D model, the estimating process relies on correspondences between some 2D features in the images and their counterparts on the 3D model.

Solutions for different pose estimation problems are taught by Haralick, R. M. in *Pose estimation from corresponding point data*, IEEE Transactions on Systems, Man and Cybernetics, Volume 19, Issue 6, November/December 1989 Page(s):1426-1446.

Figure 5:
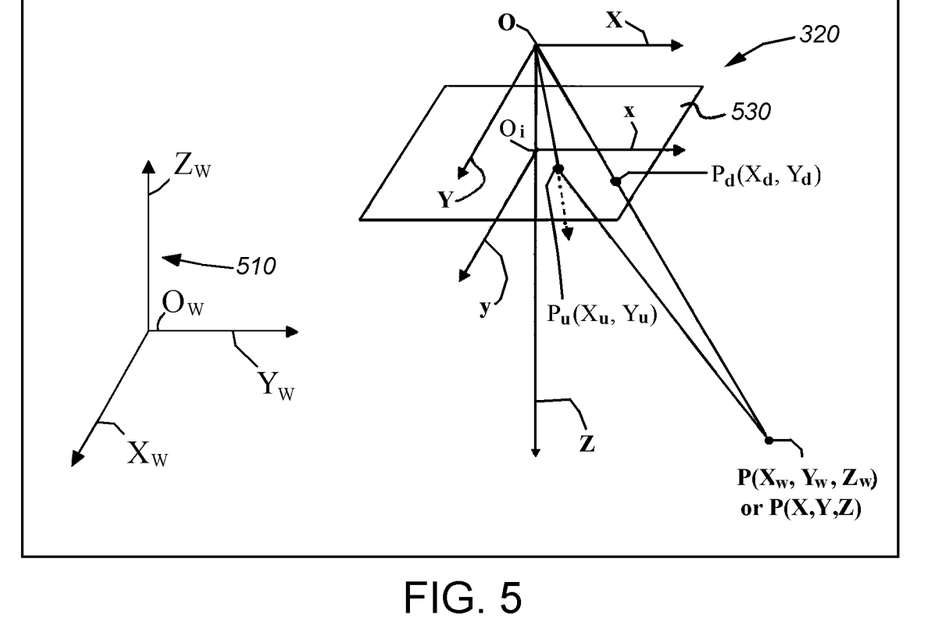
FIG. 5 is a graphical representation of the mapping points between a 3D world coordinate space and a 2D camera coordinate space, for use in embodiments herein.

By way of further illustration, and as provided in the Tsai publication, FIG. 5 illustrates the basic geometry of the camera model. ($X_w$, $Y_w$, $Z_w$), defining the 3D coordinates of the object point P in the 3D world coordinate system. (X, Y, Z) define the 3D coordinates 510 of the object point P in the 3D camera coordinate system 520, which is centered at point O, the optical center, with the z axis the same as the optical axis (see also FIG. 1). (x, y) is the image coordinate system centered at $O_i$ (intersection of the optical axis z and the front image plane 530) and parallel to x and y axes. f is the distance between front image plane 530 and the optical center O. ($x_u$, $y_u$) is the image coordinate of (X, Y, Z) if a perfect pinhole camera model is used. ($x_d$, $y_d$) is the actual image coordinate which differs from ($x_u$, $y_u$) due to lens distortion. However, since the camera is now calibrated, the lens distortion can be corrected prior to the mapping.

The mapping from the 3D world coordinates to the 2D camera coordinates system is illustratively provided as a four step transformation, which proceeds according to the following steps:

1. Perform rigid body transformation from the object 3D world coordinate system ($X_w$, $Y_w$, $Z_w$) 510 to the camera 3D coordinate system (X, Y, Z)

$$\begin{bmatrix} X \\ Y \\ Z \end{bmatrix} = R \begin{bmatrix} X_w \\ Y_w \\ Z_w \end{bmatrix} + T$$

Where R is a 3×3 rotation matrix and T is the 3×1 translation vector. The parameters to be calibrated are R and T.

2. Perform transformation from 3D camera coordinates (X, Y, Z) to ideal (undistorted) image coordinates ($x_u$, $y_u$) using perspective projection with pinhole camera geometry $$x_u = f \frac{X}{Z}$$

$$y_u = f \frac{Y}{Z}$$

3. Calculate radial lens distortion as $$x_d + D_x = x_u$$

$$y_d + D_y = y_u$$

Where ($x_d$, $y_d$) is the distorted or true image coordinate on the image plane 530. There are a number of models available for specifying radial lens distortion. For one of the models, $$D_x = x_d(\kappa_1 r^2 + \kappa_2 r^4 + \dots)$$

$$D_y = y_d(\kappa_1 r^2 + \kappa_2 r^4 + \dots)$$

$$r = \sqrt{x_d^2 + y_d^2}$$

The type of model to be used can be decided based upon the type of lens that is used for imaging.

4. Perform true image coordinate ($x_d$, $y_d$) to processor image coordinate ($x_f$, $y_f$) transformation $$x_f = a_x d_x'^{-1} x_d + C_x$$

$$y_f = d_y^{-1} y_d + C_y$$

Where
($x_f$, $y_f$) Row and column numbers of the image pixel in processor image frame memory
($C_x$, $C_y$) Computer image coordinate for the origin in the image plane $$d_x' = d_x \frac{N_{cx}}{N_{fx}}$$

$d_x$ Center to center distance between adjacent sensor elements in x (scan line) direction
$d_y$ Center to center distance between adjacent CCD sensor in the y direction
$N_{cx}$ Number of sensor elements in the x direction
$N_{fx}$ Number of pixels in a line as sampled by the processor
$a_x$ is due to a variety of factors, such as slight hardware timing mismatch between image acquisition/processor hardware and camera scanning hardware, or the imprecision of the timing of scanning itself. Setting $s_x = a_x d_x'^{-1}$, and setting $d_y$ to one, we need to find $s_x$. When $d_y$ is set to one, the computed focal length f will be a product of the actual focal length and the scale factor in y.

The pose estimation problem is the same as camera extrinsic calibration for which the camera intrinsics are already known. To simplify the problem, the 2D image points detected in raw images are normalized to be represented in reference image plane as step 2 in the above description. Hence the pose estimation problem can be formulated as such:

Given a set of world points ($X_w$, $Y_w$, $Z_w$)$_i$, i=1, 2, . . . , n, and a corresponding set of normalized image points ($x_u$, $y_u$)$_i$, the pose estimation problem consists of finding a rotation matrix R and a translation vector T that minimize the geometric reprojection error:

$$\sum_{i=1}^{n} \left[ \left(x_u - f\frac{RX_w + t_x}{RZ_w + t_z}\right)^2 + \left(y_u - f\frac{RY_w + t_y}{RZ_w + t_z}\right)^2 \right]^2$$

Alternatively, since each image point defines a projection ray that can be represented as a 3D line, the pose estimation problem is equivalent to finding a transform such that the 3D point-to-line distance is minimal for all pairs, which is also known as object space collinearity.

The minimization of the error measurement can be done by a non-linear optimization method such as Levenberg-Marquardt.

In a multi-camera (or multi-view) vision system, after all cameras are calibrated to the same world coordinate system, the correspondences for each camera can be added to one linear system and solved simultaneously. Using multiple cameras has the advantage of improved resolution of ambiguity and improved accuracy.

3. Estimating 3D Pose of an Object by Directly Matching Polyhedral Models to Gray Value Gradients Section 2 above describes the pose estimation problem as a non-linear optimization problem in which the rigid transformation (rotation and translation) of the object is found by minimizing an error measurement based on reprojection error of corresponding 2D and 3D points.

Alternatively, when the 2D-3D correspondence is hard to establish, the 3D pose of an object can be estimated by directly matching the model at different hypothesized poses to gray level gradient images, and report the pose with highest matching score.

For example, the matching process can be done as the following steps:
  a. Set up a search space for Rx, Ry, Rz and $t_x$, $t_y$, $t_z$. Each sampling point in the 6 dimensional space Rx, Ry, Rz, $t_x$, $t_y$, $t_z$ defines a hypothesized pose.
  b. For each sampling point (hypothesized pose), project the 3D model of the object to image space based on camera calibration. Compute the matching score between the projected 2D points and gray level gradient images.
  c. Search for the maximal score in the 6-dimensional space Rx, Ry, Rz, $t_x$, $t_y$, $t_z$. Apply typical peak detection techniques such as non-maximal suppression.
  d. The pose associated with the maximal score is the estimated pose for the object.

Note in step b, when projecting the 3D model to an image plane, the topology of the 3D model should be accounted for by removing self occluding features.

The following is a technique for employing the estimations of location and pose as described above to compare two measurements of such in accordance with illustrative embodiments.

i. Comparing Two Estimations of 3D Position of a Feature Point

When comparing two estimation of 3D position of a feature point, the Euclidean distance of two estimated 3D points can be used:

$$\text{Dist}(P_1, P_2) = ((P_{1x} - P_{2x})^2 + (P_{1y} - P_{2y}) + (P_{1z} - P_{2z})^2)^{1/2}$$

When the found first feature and the found second feature are substantially the same, a direct comparison can be made between the Euclidean distance of the two found positions with at least one of (i) an accuracy determined during step (a), and (ii) a desired system accuracy.

Figure 1C:
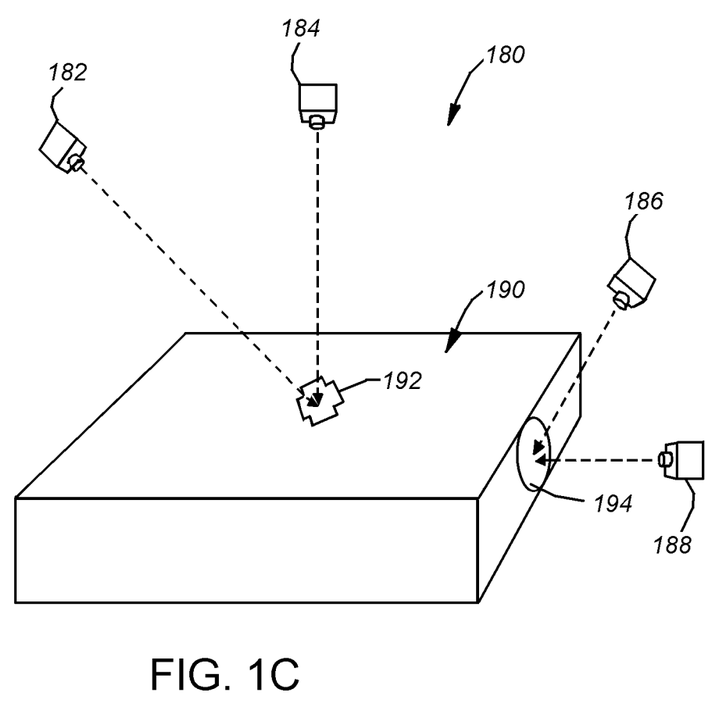
FIG. 1C is a diagram of an exemplary system in which two pairs (two pluralities) of cameras each undertake machine vision tasks with respect to an object, each of the pluralities operating with respect to a different discrete feature of the object.

Referring briefly to the vision system arrangement 180 FIG. 1C, the cameras 182, 184, 186, 188 are arranged in two groupings (182, 184) and (186, 188), each comprising a plurality of cameras herein. As in other embodiments described herein, the cameras 182, 184, 186, 188 can each include a variety of internal and external hardware and software processes for image acquisition and vision system processing. External processors and associated devices (not shown) can also be provided as appropriate, the cameras and/or external devices can be connected by wired and/or wireless connections as appropriate. All cameras acquire images of an exemplary object 190 within the volume space. An exemplary first feature 192 and an exemplary second feature 194 are provided at remote locations and or differing surfaces/3D orientations on the object. The camera grouping/plurality 182, 184 is acquires and find the first feature and the second grouping/plurality 182,184 acquires and finds the second feature 194. Note that where other features are provided, the groupings can be varied to employ those cameras best positioned to acquire the location and orientation of that feature on the object. Generally, in accordance with an illustrative embodiment, when the found first feature and the found second feature differ in physical space and are separated by a known physical dimension as shown (i.e. a "known property"), one comparison can be made is between the Euclidean distance of the two found positions and the known physical dimension. Another comparison can be made is between the two residual errors of the respective triangulation results.

ii. Comparing Two Estimations of 3D Pose of an Object

A pose of an object is the 3D rigid transformation needed to map an object model from its inherent coordinate system into agreement with the sensory data. Pose estimation consists of a rotation matrix R and a translation vector T. A number of ways can be used to compare two pose estimation of an object.

One intuitive measurement is the root mean square distance between the two model point sets that are transformed with the two poses:

Let $P=\{\vec{p}_i\}$, i=1, 2, ..., N be a model point set, the root mean square distance of two pose estimates is defined as $$D = \left(\frac{1}{N}\sum_{i=1}^{n} \|(R_1\vec{p}_i + T_1) - (R_2\vec{p}_i + T_2)\|^2\right)^{1/2},$$

In which $[R_1|T_1]$ represent the first pose estimate, $[R_2|T_2]$ represent a second pose estimate.

The model point set can be defined as a handful unique feature points on the surface or interior of the object model. Alternatively, it can be defined as the vertices of the tessellated facets on the surface of solid models.

An alternate technique of comparing two poses is to compute the amount of work that it would employ a robot to move the object from a first pose $[R_1|T_1]$ to a second pose $[R_2|T_2]$. The transformation between the two poses is still a rigid body transformation $[R_1|T_1]^{-1} \cdot [R_2|T_2]$. The object can be moved from the first pose to a second pose with one combined operation of rotation and translation that is known as skew theory. To compare the two poses, one can compute the screw axis and the screw motion parameters for transformation $[R_1|T_1]^{-1} \cdot [R_2|T_2]$. For each point in the model point set, a line integral along the helix of the operation can be computed. The displacement between the two poses is then computed as the summation of all points in the model point set. Again, the model point set can be a set of distinct feature points on the surface of the object, or the vertices of tessellated facets on the object.

It should be clear that the system and method of the illustrative embodiment provides an effective technique for identifying miscalibration of one or more cameras in a system of three or more machine vision cameras, due to variation in extrinsic parameters. This system and method ensures that miscalibration is identified before it enables erroneous machine vision tasks to occur and can enable recalibration via automated. Notably, this system and method is applicable to a variety of inspection applications and mechanisms for determining object feature location or pose.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the system can operate on multiple features and poses of an object to perform comparison with a desired accuracy or other threshold. Also, the term "location" should be taken broadly to define a variety of different constructs that enable an acquired image of a feature or object to be compared to another image for the purpose of determining any drift in calibration accuracy. Alternative approaches to locating an object can also be employed. For example, a silhouette matching technique, according to conventional techniques can be used to derive measurements in accordance with an embodiment. Moreover, the object or part can be defined as a permanent feature (a fiducial, for example) within the scene, that can be acquired along with each part acquisition. This permanent feature or pattern is used to determine measurements in accordance with an illustrative embodiment. Moreover, it is expressly contemplated that any of the processes and procedures described herein can be implemented as hardware, software consisting of computer-readable program instructions or a combination of hardware and software. Accordingly, this description is meant to be taken only by way of example, and not to otherwise limit the scope of this invention.

What is claimed is:

1. A method for determining camera miscalibration in a system of at least three cameras, comprising the steps of:
    a) during a first calibration process and prior to a runtime vision inspection process, calibrating the at least three cameras, including estimating respective intrinsic calibration parameters and extrinsic calibration parameters for each of the at least three cameras and determining respective error statistics for each of the at least three cameras, wherein each of the at least three cameras is located at a different orientation with respect to a calibration object in a three-dimensional space;
    b) during the runtime vision inspection process in which an inspection object is aligned or inspected based upon a training model, the intrinsic calibration parameters, the extrinsic calibration parameters, and the error statistics, wherein the inspection object is different from the calibration object, finding a first feature on the inspection object in the three-dimensional space with a first plurality of the at least three cameras and determining a first estimated location of the first feature;
    c) during the runtime vision inspection process, comparing the first estimated location with a first predicted location from the training model to generate a first alignment score to be used in alignment or inspection of the inspection object;
    d) during the runtime vision inspection process, finding a second feature on the inspection object in the three-dimensional space with a second plurality of the at least three cameras and determining a second estimated location of the second feature;
    e) during the runtime vision inspection process, comparing the second estimated location with a second predicted location from the training model to generate a second alignment score to be used in alignment or inspection of the inspection object;

f) during the runtime vision inspection process, comparing the first alignment score and the second alignment score with respect to at least one of (i) an accuracy determined during step (a), or (ii) a desired system accuracy;

g) in response to step (f) and during the runtime vision inspection process, determining that a second calibration process is desired based upon a result of the step of comparing exceeding at least one of the (i) accuracy determined during step (a) and (ii) the desired system accuracy;

h) in response to step (g), ceasing the runtime vision inspection process; and i) in response to step (h), performing the second calibration process to recalibrate at least one of the at least three cameras, wherein the second calibration process is performed with respect to a different object than the runtime vision inspection process, and wherein the second calibration process comprises estimating the respective intrinsic calibration parameters and the extrinsic calibration parameters for at least one of the at least three cameras and redetermining the respective error statistics for at least one of the at least three cameras.

2. The method as set forth in claim 1 wherein the second calibration process includes generating new extrinsic calibration parameters based upon step (d) and providing the new extrinsic calibration parameters to the at least one of the at least three cameras so as to recalibrate the at least one of the at least three cameras.

3. The method as set forth in claim 1 wherein the accuracy determined during step (a) includes a collection of values based upon calibration residual errors.

4. The method as set forth in claim 2 further comprising providing the new extrinsic parameters so as to recalibrate the at least one of the at least three cameras in accordance with step (a).

5. The method as set forth in claim 1 wherein the system of at least three cameras performs a machine vision system inspection so as to perform runtime machine vision inspection to objects that pass through a volume space viewed by the at least three cameras.

6. The method as set forth in claim 1 wherein the desired system accuracy is based upon historical values for each of the first estimated location and the second estimated location.

7. The method as set forth in claim 1 wherein the desired system accuracy is based upon a predetermined threshold value.

8. The method as set forth in claim 7 wherein the predetermined threshold value is defined based upon a desired accuracy of a runtime vision system task.

9. The method as set forth in claim 1 further comprising recalibrating, during the second calibration process, the at least one of the at least three cameras based upon new intrinsic parameters.

10. A system for determining camera miscalibration in a system of at least three cameras, comprising:

a) at least three cameras, each including respective intrinsic calibration parameters, extrinsic calibration parameters, and respective error statistics estimated prior to a runtime vision inspection process and during a first calibration process using a calibration object, each of the at least three cameras is located at a different orientation with respect to an inspection object in a three-dimensional space, wherein the inspection object is different from the calibration object;

b) a first plurality of the at least three cameras that find a first feature on the inspection object in three-dimensional space, during the runtime vision inspection process in which the inspection object is aligned or inspected based upon a training model, intrinsic calibration parameters, extrinsic calibration parameters, and the error statistics, and determine a first estimated location of the first feature;

c) a second plurality of the at least three cameras that find a second feature on the inspection object in three-dimensional space, during the runtime vision inspection process in which an inspection object is aligned or inspected based upon a training model, intrinsic calibration parameters, extrinsic calibration parameters, and the error statistics, and determine a second estimated location;

d) a comparison process that compares the first estimated location with a first predicted location from the training model to generate an alignment score to be used in alignment or inspection of the inspection object, compares the second estimated location with a second predicted location from the training model to generate a second alignment score to be used in alignment or inspection of the inspection object, and compares the first alignment score and the second alignment score with respect to at least one of (i) an accuracy associated with the extrinsic calibration parameters or (ii) a desired system accuracy;

e) a recalibration determination process that, in response to the comparison process d) and during the runtime vision process, determines that a second calibration process is desired based upon a result of the step of comparing exceeding at least one of the (i) accuracy determined during step (a) and (ii) the desired system accuracy; and f) a recalibration process that ceases the runtime vision inspection process, and performs the second calibration process to at least one of the at least three cameras, wherein the second calibration process is performed with respect to a different object than the runtime vision inspection process, and wherein the second calibration process comprises redetermining the respective intrinsic calibration parameters, the extrinsic calibration parameters, and the respective error statistics for at least one of the at least three cameras.

11. The method as set forth in claim 1 wherein the first camera of the first plurality of the at least three cameras is the same as the first camera of the second plurality of the at least three cameras, and the second camera of the first plurality of the at least three cameras is the same as the second camera of the second plurality of the at least three cameras.

12. The method as set forth in claim 1 wherein the first camera of the first plurality of the at least three cameras is the same as the second camera of the second plurality of the at least three cameras, and the second camera of the first plurality of the at least three cameras is the same as the first camera of the second plurality of the at least three cameras.

13. The method of claim 1 wherein the extrinsic calibration parameters define a 3D world coordinate space for each of the at least three cameras.

14. The system of claim 10 wherein the extrinsic calibration parameters define a 3D world coordinate space for each of the at least three cameras.

15. A method for determining camera miscalibration in a system of at least three cameras, each camera located at a different orientation with respect to a calibration object in a three-dimensional space, the method comprising the steps of:
- a) during a first calibration process, receiving calibration data including at least one of: estimated respective intrinsic calibration parameters for each of the at least three cameras, estimated respective extrinsic calibration parameters for each of the at least three cameras, or respective error statistics for each of the at least three cameras;
- b) during the runtime vision inspection process in which an inspection object is aligned or inspected based upon a training model and the at least one of the estimated intrinsic calibration parameters, the estimated extrinsic calibration parameters, or the error statistics, finding a first feature on the inspection object in the three-dimensional space with a first plurality of the at least three cameras and determining a first estimated location of the first feature, wherein the inspection object is different from the calibration object;
- c) during the runtime vision inspection process, comparing the first estimated location with a first predicted location from the training model to generate a first alignment score to be used in alignment or inspection of the inspection object;
- d) during the runtime vision inspection process, comparing the first alignment score with respect to at least one of (i) an accuracy determined during step (a), or (ii) a desired system accuracy;
- e) in response to step (d) and during the runtime vision inspection process, determining that a second calibration process is desired based upon a result of the step of comparing exceeding at least one of the (i) accuracy determined during step (a) and (ii) the desired system accuracy;
- f) in response to step (e), ceasing the runtime vision inspection process; and
- g) in response to step (f), performing the second calibration process to recalibrate at least one of the at least three cameras, wherein the second calibration process is performed with respect to a different object than the runtime vision inspection process, and wherein the second calibration process comprises at least one of: estimating the respective intrinsic calibration parameters, estimating the extrinsic calibration parameters for at least one of the at least three cameras, or redetermining the respective error statistics for at least one of the at least three cameras.

16. The method of claim 15, further comprising:
during the runtime vision inspection process, finding a second feature on the inspection object in the three-dimensional space with a second plurality of the at least three cameras and determining a second estimated location of the second feature; and
during the runtime vision inspection process, comparing the second estimated location with a second predicted location from the training model to generate a second alignment score to be used in alignment or inspection of the inspection object.

17. The method of claim 15, wherein the at least one of the estimated respective intrinsic calibration parameters for each of the at least three cameras, the estimated respective extrinsic calibration parameters for each of the at least three cameras, or the respective error statistics for each of the at least three cameras comprises each of the estimated respective intrinsic calibration parameters for each of the at least three cameras, the estimated respective extrinsic calibration parameters for each of the at least three cameras, and the respective error statistics for each of the at least three cameras.

18. The method of claim 1, wherein the second calibration process of step (i) is performed with respect to the calibration object of step (a).

\* \* \* \* \*